United States Patent
Novlan et al.

(10) Patent No.: US 11,234,241 B2
(45) Date of Patent: Jan. 25, 2022

(54) ASSISTED RESOURCE ALLOCATION IN A PEER TO PEER WIRELESS NETWORK

(71) Applicant: AT&T Intellectual Property I, L.P., Atlanta, GA (US)

(72) Inventors: Thomas Novlan, Cedar Park, TX (US); Ralf Bendlin, Cedar Park, TX (US); Milap Majmundar, Austin, TX (US); Xiaoyi Wang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 209 days.

(21) Appl. No.: 16/246,031

(22) Filed: Jan. 11, 2019

(65) Prior Publication Data
US 2020/0229192 A1 Jul. 16, 2020

(51) Int. Cl.
*H04W 72/04* (2009.01)
*H04W 28/02* (2009.01)
(Continued)

(52) U.S. Cl.
CPC ....... *H04W 72/0486* (2013.01); *H04L 5/0055* (2013.01); *H04W 4/40* (2018.02);
(Continued)

(58) Field of Classification Search
None
See application file for complete search history.

(56) References Cited

U.S. PATENT DOCUMENTS 10,045,249 B2  8/2018  Lee et al.
10,117,240 B2  10/2018  Blasco Serrano et al.
(Continued)

FOREIGN PATENT DOCUMENTS

CN        107347215 A     11/2017
WO        2017157128 A1    9/2017
WO     WO-2018202798 A1 *  11/2018 ............... H04W 4/08

OTHER PUBLICATIONS

Bonjorn, et al. "Enhanced 5G V2X Services using Sidelink Device-to-Device Communications" 2018 17th Annual Mediterranean Ad Hoc Networking Workshop (Med-Hoc-Net). IEEE, 2018. 8 pages.

*Primary Examiner* — Hassan A Phillips
*Assistant Examiner* — Gautam Sharma
(74) *Attorney, Agent, or Firm* — Amin, Turocy & Watson, LLP

(57) ABSTRACT

The technologies described herein are generally directed toward communicating resource information to a local manager of a group of user equipment devices, for allocation of resources to the group. According to an embodiment, a system can comprise a processor and a memory that can store executable instructions that, when executed by the processor, facilitate performance of operations. The operations can include selecting a first group of resources for a group of user equipment devices. The operations can further include communicating, to a first user equipment device of the group of the user equipment devices, first information corresponding to the first group of resources, the first user equipment device being a first local manager of the group, that communicates second information corresponding to a second group of resources, based on the first information, to respective other user equipment devices of the group, other than the first user equipment device.

20 Claims, 10 Drawing Sheets

(51) Int. Cl.
  *H04L 5/00* (2006.01)
  *H04W 4/40* (2018.01)
(52) U.S. Cl.
  CPC ... *H04W 28/0278* (2013.01); *H04W 28/0284* (2013.01); *H04W 72/042* (2013.01)

(56) References Cited

U.S. PATENT DOCUMENTS

| | | | | |
|---|---|---|---|---|
| 2001/0012757 | A1* | 8/2001 | Boyle | H04W 84/20 455/11.1 |
| 2005/0086273 | A1* | 4/2005 | Loebbert | H04W 12/0609 |
| 2007/0135059 | A1* | 6/2007 | Yomo | H04W 52/46 455/69 |
| 2014/0335853 | A1* | 11/2014 | Sartori | H04W 4/70 455/426.1 |
| 2017/0099624 | A1 | 4/2017 | Baghel et al. | |
| 2018/0042023 | A1 | 2/2018 | Sheng | |
| 2018/0048994 | A1 | 2/2018 | Kwon et al. | |
| 2018/0103460 | A1 | 4/2018 | Sharma et al. | |
| 2018/0132208 | A1 | 5/2018 | Pan et al. | |
| 2018/0160445 | A1 | 6/2018 | Babaei et al. | |
| 2018/0192266 | A1* | 7/2018 | Park | H04W 4/80 |
| 2018/0242190 | A1* | 8/2018 | Khoryaev | H04L 47/32 |
| 2018/0270722 | A1 | 9/2018 | Kim et al. | |
| 2018/0332585 | A1 | 11/2018 | Faurie et al. | |
| 2018/0376474 | A1 | 12/2018 | Khoryaev et al. | |
| 2019/0021111 | A1 | 1/2019 | Tang | |
| 2019/0037442 | A1* | 1/2019 | Yi | H04W 76/27 |
| 2019/0312693 | A1* | 10/2019 | Belleschi | H04B 17/327 |
| 2020/0022089 | A1* | 1/2020 | Guo | H04W 92/18 |
| 2020/0099476 | A1* | 3/2020 | Park | H04W 72/0406 |
| 2020/0100215 | A1* | 3/2020 | Li | H04L 5/0094 |
| 2020/0107236 | A1* | 4/2020 | Tseng | H04W 36/08 |
| 2020/0145799 | A1* | 5/2020 | Baghel | H04L 5/0055 |

\* cited by examiner

ASSISTED RESOURCE ALLOCATION IN A PEER TO PEER WIRELESS NETWORK

TECHNICAL FIELD

The subject application is related to wireless communication systems, and, for example, the allocation of resources to user equipments (UEs) in a peer to peer wireless network.

BACKGROUND

Currently, in some peer to peer wireless networks, when resources are needed for communication, UEs are can be individually allocated resources from a network resource though a network base station. Alternatively, some peer to peer networks assign the task of resource allocation to a UE member of the network.

In certain circumstances, neither of these approaches offers an optimal range of resources for selection by UEs of the peer to peer network. An improper range of available recourses can lead to sub-optimal communication within the peer to peer network, based on unavailable resources, interference when multiple devices share a resource, problems with resource power levels, and other similar problems.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
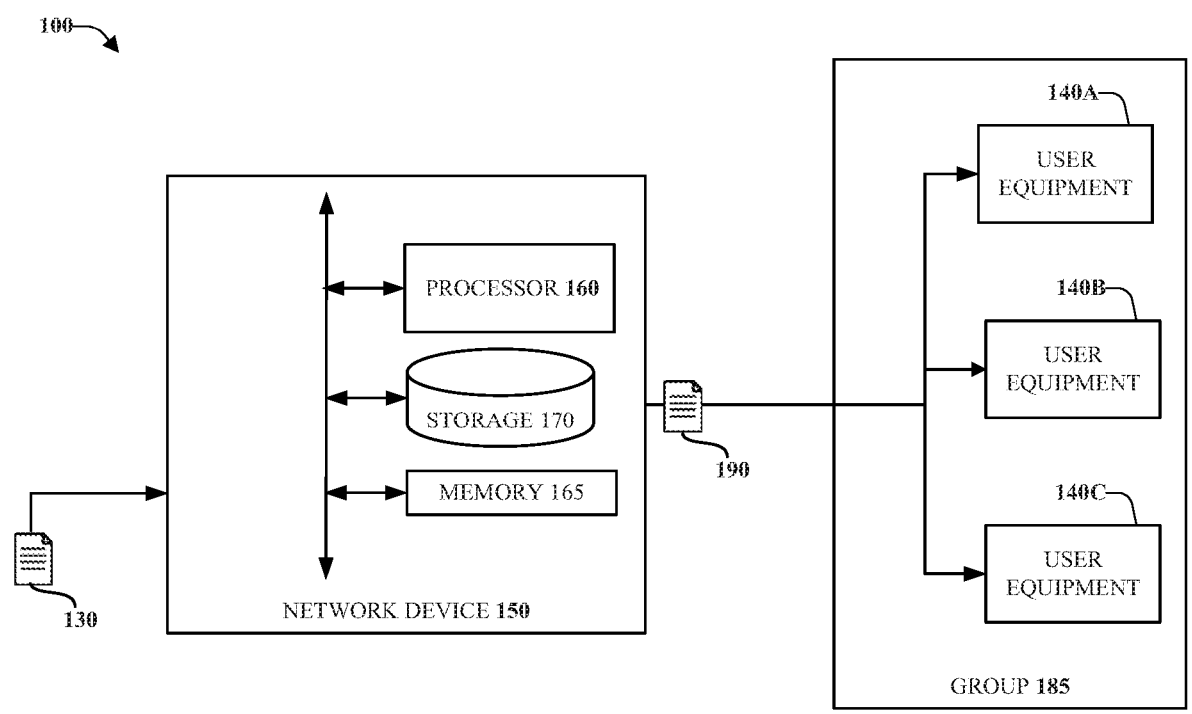
FIG. 1 is an architecture diagram of an example system that can facilitate communicating resource information to a local manager of a group of user equipment devices, for allocation of resources to the group, in accordance with one or more embodiments.

Generally speaking, one or more embodiments described herein provide mechanisms and signaling to enable network assisted resource allocation by a local manager of a peer to peer network. Applying these approaches to a vehicle to everything (V2X) network, one or more embodiments are based on a hybrid utilization of different types of network configurations and an allocation of sidelink resources on a dynamic basis, while maintaining the use of sidelink control signaling and feedback between UEs.

In addition, one or more embodiments described herein can be directed towards a multi-connectivity framework that supports the operation of New Radio (NR, sometimes referred to as 5G). As will be understood, one or more embodiments can allow an integration of V2X UEs with network assistance, by supporting control and mobility functionality on cellular links (e.g. LTE or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

FIG. 1 illustrates a block diagram of an example, non-limiting system 100 that includes network device 150 and UEs 140A-C in group 185. Network device 150 can facilitate communicating resource information 190 to a local manager (e.g., UE 140A) of a group of user equipment devices (e.g., UEs 140A-C), for allocation of resources to the group, in accordance with one or more embodiments described herein.

According to multiple embodiments, network device 150 includes memory 165 can store one or more computer and/or machine readable, writable, and/or executable components and/or instructions that, when executed by processor 160, can facilitate performance of operations defined by the executable component(s) and/or instruction(s). For example, memory 165 can store computer and/or machine readable, writable, and/or executable components and/or instructions that, when executed by processor 160, can facilitate execution of the various functions described herein relating to network device 150, including communicating resource information to the local manager.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1004 of FIG. 10. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

One or more embodiments of network device 150 can receive resource information, e.g., time and frequency combinations that can facilitate wireless communication between UEs. For example, FIG. 1 depicts UEs 140A-C that can communicate within the group via sidelink communication, using resources provided by network device 150.

Using different approaches described below, one or more embodiments of network device 150 can determine a group of resources for use by UEs in group 185. Having selected this group of resources, different embodiments can relay information corresponding to these centrally determined resources to UEs 140A-C using different paths. The descriptions of FIGS. 2-6 below provide example approaches to allocating resources that can be used by one or more embodiments.

Figure 2:
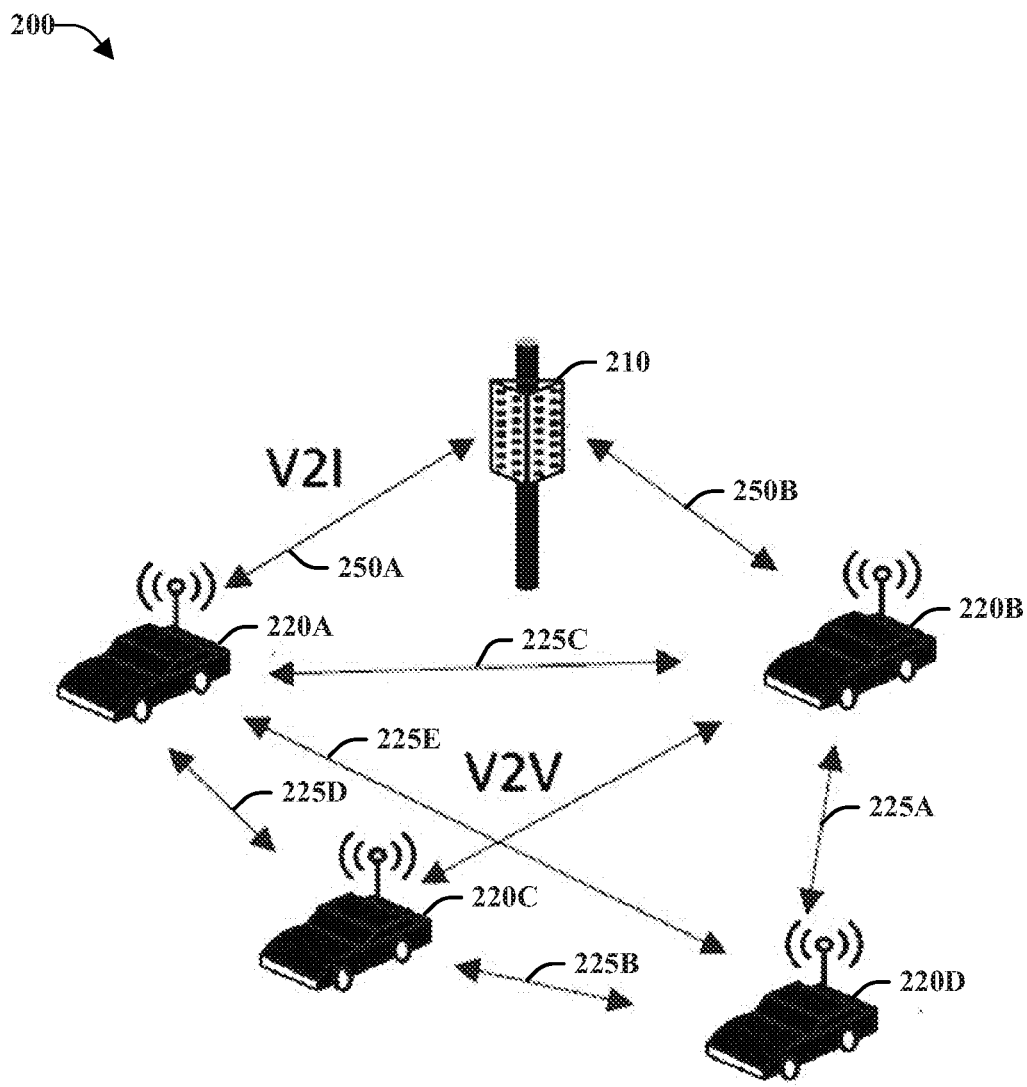
FIG. 2 illustrates an example wireless communication system showing an example peer to peer network with connections between vehicles and connections to a network device, in accordance with one or more embodiments.

FIG. 2 illustrates an example wireless communication system 200 showing an example peer to peer network with connections 225A-E between UEs 220A-D and connections 250A-B to network device 210, in accordance with one or more embodiments. It should be noted that, on FIGS. 2-6, UEs are represented by vehicle icons, and network devices are represented by base station icons, but these icons are not intended to be limiting of the types of UEs and network devices that can be used with the embodiments discussed herein. Detailed examples of different types of UEs 220A-D that can be used with embodiments are described with FIG. 9 below, and detailed examples of different types of computer-enabled devices (e.g., network device 210) that can be used with embodiments are described with FIG. 10 below. For purposes of brevity, description of like elements and/or processes employed in other embodiments is omitted.

In an example implementation of one or more embodiments, FIG. 2 depicts V2X wireless services that comprise vehicle-to-infrastructure (V2I) connections 250A-B between UEs 220A-D (e.g., vehicles) and network device 210, e.g., next-generation node b devices, roadside access point units, and base stations. The V2X wireless services also depict vehicle-to-vehicle (V2V) connections 225A-E (e.g., peer to peer) that can be established over the existing cellular (Uu) interface or a sidelink interface, e.g., direct communication between UEs that does not use the cellular interface.

Resource allocation for peer to peer connections 225A-E in this example can be accomplished by direct cellular connections (e.g., connections 250A-B to UEs 220A-B) between network device 210 and UEs 220A-D. This type of central management of resource allocation can be advantageous in some circumstances, e.g., avoiding contention. This type can also cause sub-optimal results, e.g., network device 210 is tasked with individually allocating resources to large numbers of UEs 220A-D, and network device 210 can take a comparatively long time to update resource allocations to match changing conditions.

Figure 3:
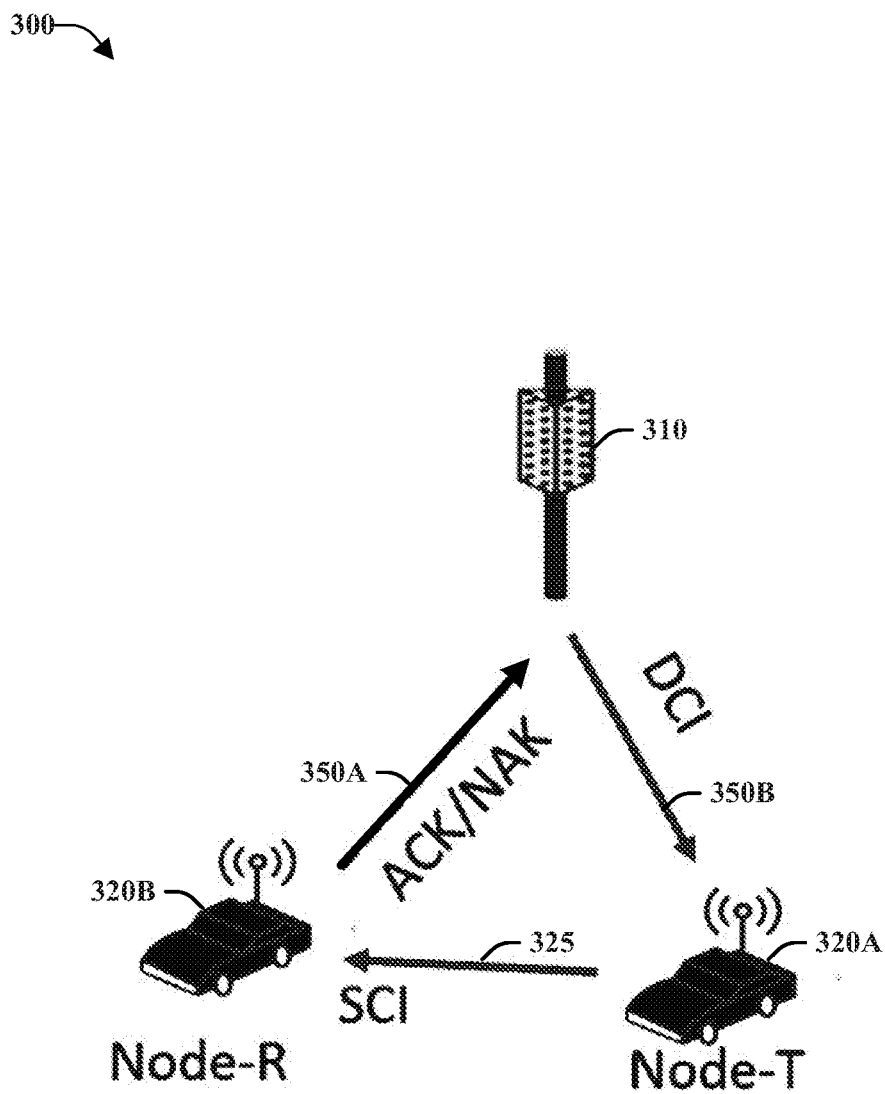
FIG. 3 illustrates an example wireless communication system showing an example peer to peer network with resources allocated by a network device, via a transmitting node user equipment, to a receiving node user equipment, in accordance with one or more embodiments.

FIG. 3 illustrates an example wireless communication system showing an example peer to peer network with resources allocated by network device 310 to receiving node UE 320B (e.g., labeled Node-R) by an example process described below, in accordance with one or more embodiments. For purposes of brevity, description of like elements and/or processes employed in other embodiments is omitted.

As depicted, an example mechanism for peer to peer resource allocation can use network device 310 (e.g., a base station) to select the resources for allocation and to communicate the resource allocation (e.g., by connection 350B) to transmitting node UE 320A (e.g., labeled Node-T). In the example, transmitting node UE 320A can transmit the resource allocations to receiving node UE 320B as specified by network device 310. In response to receiving the resource allocation, receiving node UE 320B can transmit an acknowledgement or negative-acknowledgement (e.g., labeled ACK/NAK) using a connection (e.g., by connection 350A).

Considering the example communications in greater detail, in one or more embodiments, network device 310 communicates the above-noted resource allocations by sending a downlink control message (DCI) using a physical downlink control channel (PDCCH) with connection 350B. Transmitting node UE 320A can then send a sidelink control information (SCI) message along with the resource allocations to receiving node UE 320B. Based on whether the reception of the data was successful or not, receiving node UE 320B can send ACK/NACK feedback to the network device 310 using an uplink control message (UCI).

Figure 4:
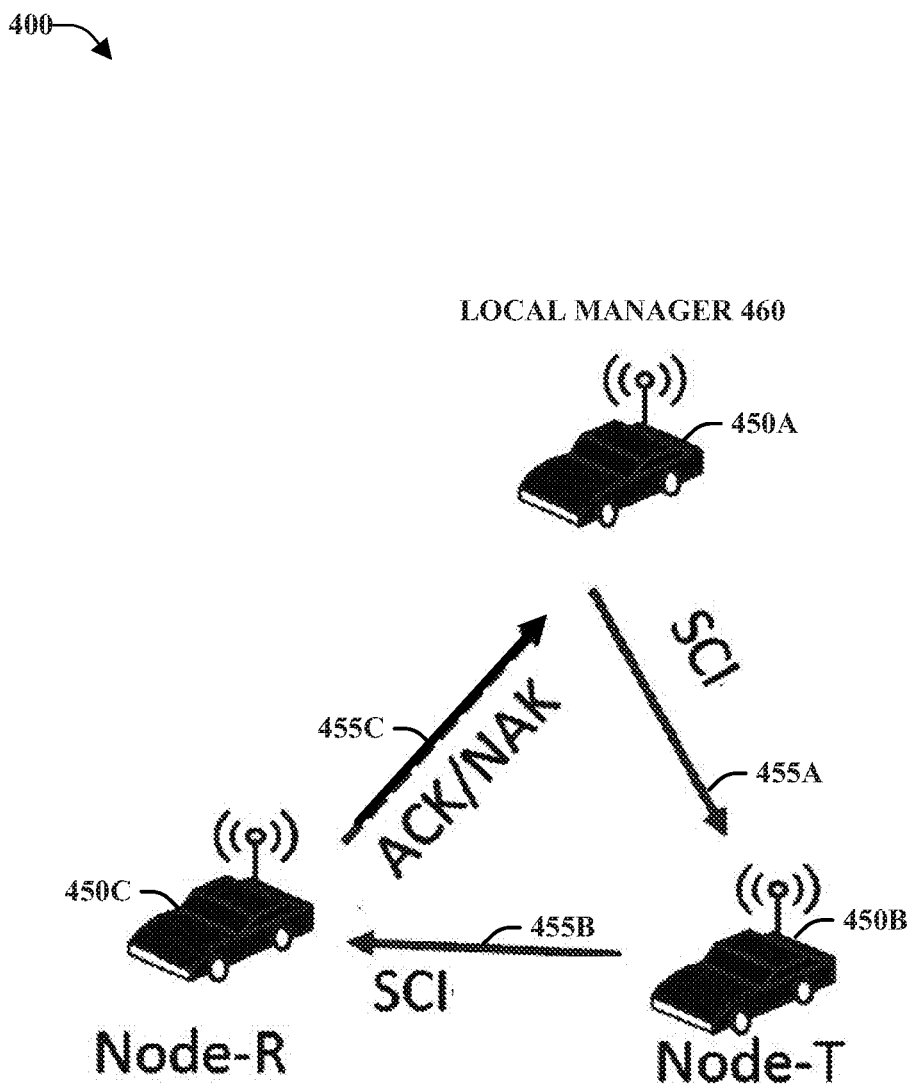
FIG. 4 illustrates an example wireless communication system showing an example peer to peer network with resources allocated, via a transmitting node user equipment, to a receiving node user equipment by a user equipment device operating as a local manager of the peer to peer network, in accordance with one or more embodiments.

FIG. 4 illustrates an example wireless communication system showing an example peer to peer network with resources allocated using UE 450A designated as local manager 460. In one or more embodiments, a local manager can be promoted to manage a local group of UEs that exchange information by employing sidelink connections. For purposes of brevity, description of like elements and/or processes employed in other embodiments is omitted.

In this example mechanism, UE 450A can be designated as local manager 460 and used to select and allocate the resources to other members of a group of UEs, e.g., to receiving node 450C. In this example, instead of receiving resource allocations in DCI format from network device 310, transmitting node UE 450B receives resource allocations in SCI format from local manager 460. SCI format is also used to communicate resource allocations via connection 455B to receiving node 450C. In this mechanism, instead of feedback being sent to network device 310, as in FIG. 3, receiving node 450C gives feedback (e.g., ACK/NAK) on the resource allocations using connection 455C.

In this example approach, assigned resource pools for local manager 460 can be provided by a network authority (not shown) by semi-static signaling, e.g., using a system information broadcast or a dedicated radio resource control (RRC) message.

Figure 5:
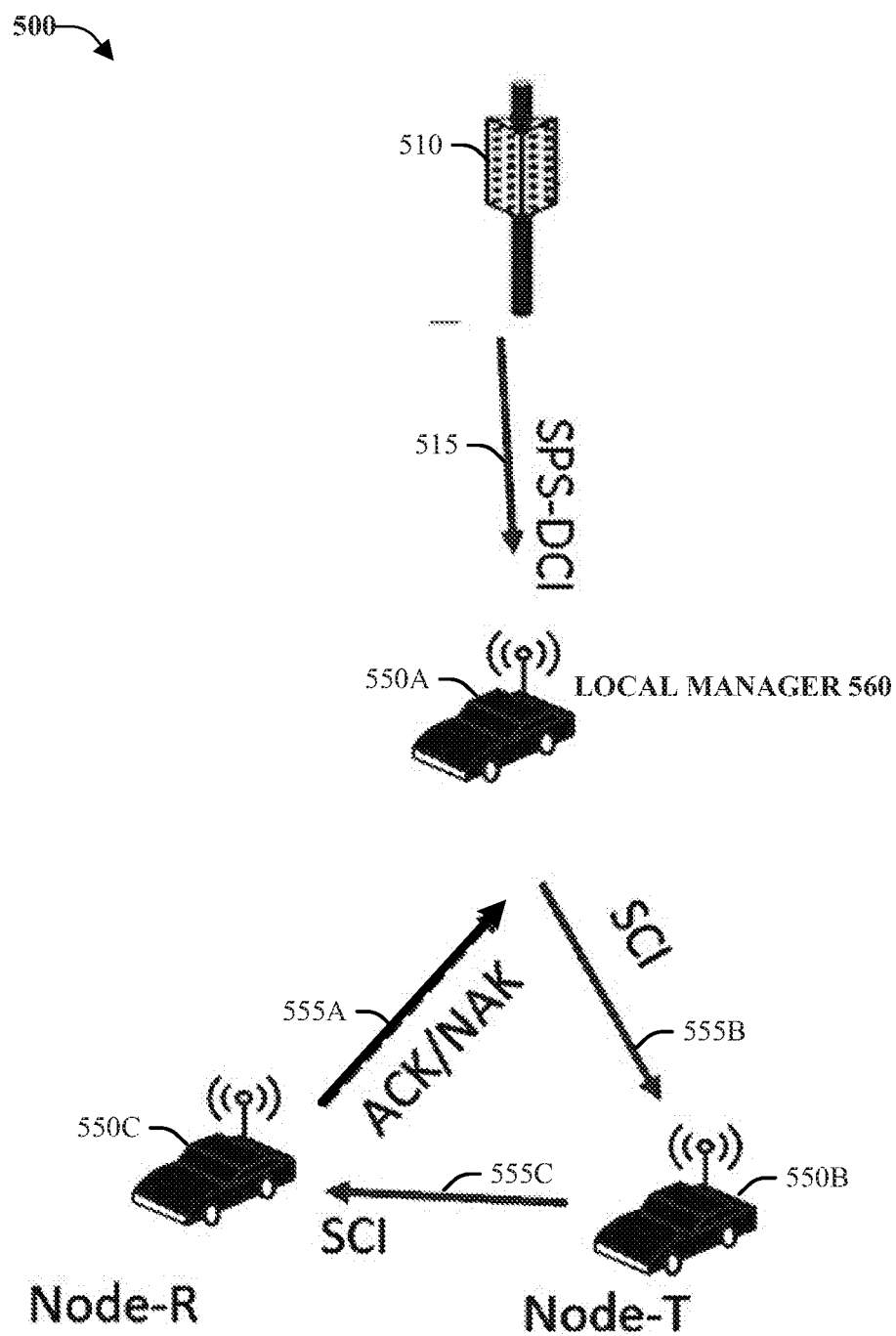
FIG. 5 illustrates an example wireless communication system showing an example peer to peer network with resources allocated by a base station, via a local manager and transmitting node user equipment, to a receiving node user equipment, in accordance with one or more embodiments.

FIG. 5 illustrates an example wireless communication system showing an example peer to peer network where resource allocations can be made by UE 550A acting as a local manager 560. In the example approach depicted, when selecting resources to allocate, UE 550A can be assisted by information provided by network device 510, in accordance with one or more embodiments. For purposes of brevity, description of like elements and/or processes employed in other embodiments is omitted.

In this example approach, like the approach described with FIG. 4 above, UE 550A, as local manager, directly makes a final selection and allocation of resources to UEs to which it is connected, e.g., to UEs 550B-C connected to UE 550A by connection 555A-B respectively. Before making this selection however, in one or more embodiments, UE 550A as local manager 560 can receive information corresponding to a group of resources selected based on analysis. From this group of resources provided from network device 510, UE 550A as local manager 560 can select a subset for allocation to individual UEs 550B-C.

Considering this example in greater detail, UE 550A as local manager 560 can receive resource allocation assistance by a DCI or semi-persistent scheduling (SPS) DCI message from network device 510 using connection 555B. In one or more embodiments, the DCI/SPS-DCI can be scrambled for UE 550A with a special identifier corresponding to UE 550A as local manager 560, e.g., a radio network temporary identifier (RNTI) so the local manager identifies the allocations received via DCI format as resource allocations intended to be allocated to associated UE(s) and not used for data transmissions by the UE 550A. In one or more embodiments, local manager 560 can send acknowledgement feedback through a dedicated physical uplink control channel (PUCCH) to network device 510. This confirmation can confirm the receipt of this resource allocation so as to prevent error propagation. In other embodiments, the resource allocations received by local manager 560 for allocation to other UEs can use the same DCI format and same RNTI as the DCI formatted messages that are intended for transmissions by local manager 560. In this situation, in one or more embodiments, an indicator can be added to the payload of the message to differentiate the two types of resource allocation, upon decoding of the DCI message.

To send allocation information from network device 510 to local manager 560, one or more embodiments can use a DCI or SPS-DCI format that differs from a typical format for these messages. In an example format, the cyclic redundancy check (CRC) bits of the physical downlink control channel (PDCCH) that can carry the new DCI format can differ from an existing DCI format in that it does contain resource allocation information but it does not contain information for any specific data transmission, e.g., a hybrid automatic repeat request (HARD) process ID, a new data indicator (NDI), modulation and coding scheme (MCS) information, etc. In one or more embodiments, because the actual data transmission is performed by the UEs under the control of local manager 560, data transmission information can be omitted in the DCI/SPS-DCI format from the network device 510.

Returning to a discussion of resource allocation assistance provided by network device 510, in one example, the resource allocations selected by network device 510 can include a subset of resources within a preconfigured resource pool, or can indicate a subset of resource pools out of a set of preconfigured resource pools, e.g. broadcast vs. unicast pools or in-coverage vs. partial-coverage pools. In another example, the resource allocation from the network can be for a single resource allocation instance (e.g. slot-basis) or can be for multiple resource allocation instances (e.g. multi-slot) with a predetermined time duration. In one or more embodiments that use SPS-based scheduling, the allocation and use of certain resources can be limited by time, e.g., indicated as valid for a preconfigured time duration, activated/deactivated on the basis of a timer. In one or more embodiments, resource allocations provided by network device 510 can specify that the allocations can be activated/deactivated via physical layer signaling or media access control (MAC) layer signaling from network device 510.

In one or more embodiments, network device 510 can use semi-statically configured resources to guide selection and updating of resource allocation assistance provided to UE 550A for allocation to UEs 550B-C directly. In other embodiments, network device 510 can also use network data provided by UEs 550A-C to guide selection and updating of resource allocations, e.g., perform dynamic resource allocation based on traffic-aware scheduling.

One type of data that can be generated by UEs 550A-C to describe aspects of the network environment is the individual buffer status report (BSR). These traffic reports were designed to allow individual UEs to provide network device 510 with information about the amount of data available for transmission in the uplink (UL) buffers of the individual UE, e.g., this approach can be used with the resource allocations described with FIG. 3 above.

In one or more embodiments, in the example shown in FIG. 5, to reduce the amount of data considered by network device 510, UE 550A as local manager 560 can receive BSRs from other UEs in the network, e.g., 550B-C. In one or more embodiments, UE 550A can aggregate multiple BSRs and communicate this aggregation of the buffer status reports of respective user equipment devices to network device 510.

BSRs can provide information that assists the updating of resource allocations by network device 510. For example, when the aggregate BSR shows an increase in buffer load across multiple devices managed by UE 550A, network device 510 can respond by allocating more resources and better resources to UE 550A, e.g., allocated by UE 550A according to the individual BSR reports received and aggregated by UE 550A.

In another embodiment, UE 550A can individually provide its BSR to network device 510 as a request for additional resources, e.g., for retransmission of data. In addition, because, in this approach of FIG. 5, UE 550A receives ACK/NAK feedback from other UEs 550B-C, UE 550A can update the aggregated BSR, e.g., if a large number of NAKs are received, local manager can update its BSR to request more resource for re-transmission of the NAK data.

Figure 6:
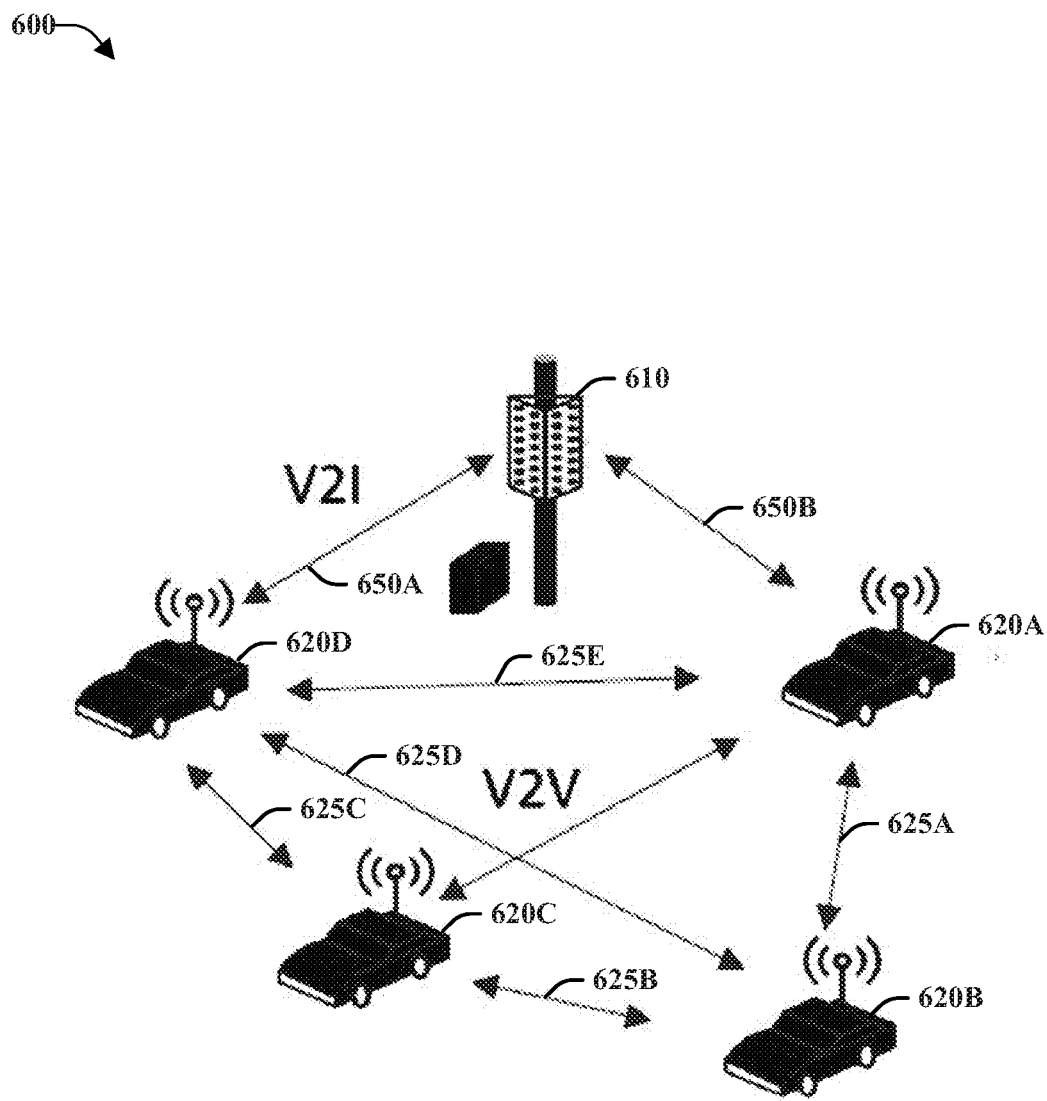
FIG. 6 illustrates an example wireless communication system showing an example peer to peer network with candidate local managers and active local managers, in accordance with one or more embodiments.

FIG. 6 illustrates an example wireless communication system 600 showing an example peer to peer network with a network device 610, a candidate local manager UE 620D connected to network device 610 by connection 650A, an active local manager UE 620A connected to network device 610 by connection 650B, UEs 620B-C, and peer (e.g., sidelink) connections 625A-E, in accordance with one or more embodiments. As discussed further below, it should be noted that the active descriptor is used in this description for local manager UE 620A to emphasize that this local manager is currently assigning resources to UEs 620B-D. For purposes of brevity, description of like elements and/or processes employed in other embodiments is omitted.

In one or more embodiments, in the approach described above in FIG. 5, selection of local manager 460 can be semi-statically performed by a network device, e.g., by evaluating characteristics of UEs available to perform local manager tasks, and other characteristics of the peer to peer network. As described with FIG. 4 above, in this approach, the assigned resource pools for local manager can be provided by semi-static signaling, e.g., using a system information broadcast or a dedicated radio resource control (RRC) message. In this example, if a new local manager is needed (e.g., if the current local manager becomes unavailable), the selection process described above can be performed (e.g., evaluating characteristics of UEs available to perform local manager tasks, and other characteristics of the peer to peer network) and a new UE can be selected for local manager, e.g., when UE 450A goes offline, UE 450B can be selected to be local manager 460.

In the example approach used by one or more embodiments depicted in FIG. 6, based on evaluation of available UEs 620A-D, more than one selection for local manager can be made, e.g., both UE 620A and UE 620D can be selected. Because, in this example, only one local manager at a time is actively allocating resources, one UE is selected to be an active local manager (e.g., active local manager UE 620A described above), and other selected UEs are termed candidate local managers, e.g., candidate local manager UE 620D.

In one or more embodiments, both candidate local manager UE 620D and active local manager UE 620A receive resource allocations from network device 610 (e.g., allocations described with FIG. 5 above), but only active local manager UE 620A communicates the resource allocations to UEs 620B and 620D. In a related element of one or more embodiments, both UE 620B and UE 620D are directed and able to receive resource allocations from both active local manager UE 620A and candidate local manager UE 620D.

In an example implementation, based on different factors such as traffic load, user mobility, and device capability, network device 610 can dynamically activate candidate local manager UE 620D to be an active local manager, and active local manager UE 620A can be deactivated to be a candidate local manager. In one or more embodiments, the activation of candidate manager UE 620D can be open ended, or for a given period of time. Also, in one example, the activation of UE 620D can be triggered by network device 610, along with a type of resource allocation, e.g., a sidelink resource allocation. It should be noted that, the selection of local managers by network device 610 is intended to be non-limiting, and one or more embodiments can enable selection of local managers by peer UEs 620A-D. It should also be noted that because, as described above, in one or more embodiments, both candidate and active local managers receive resource allocations and UEs 620B-C are directed to receive resource allocations from either 620A or 620D, the switch from UE 620A to UE 620D (e.g., to increase system performance) can generally be effected quicker than the approach described with FIG. 4 above.

In another element related to switching active local managers, in one or more embodiments, candidate manager UE 620D can have resource allocations that were pre-set to be communicated before an activation signal is received. These pre-set resource allocations can be set by network device 610, e.g., to quickly address certain circumstances with the capabilities of UE 620D. Alternatively, as described above, after activation of UE 620D can receive and make resource allocations as performed by UE 620A.

Figure 7:
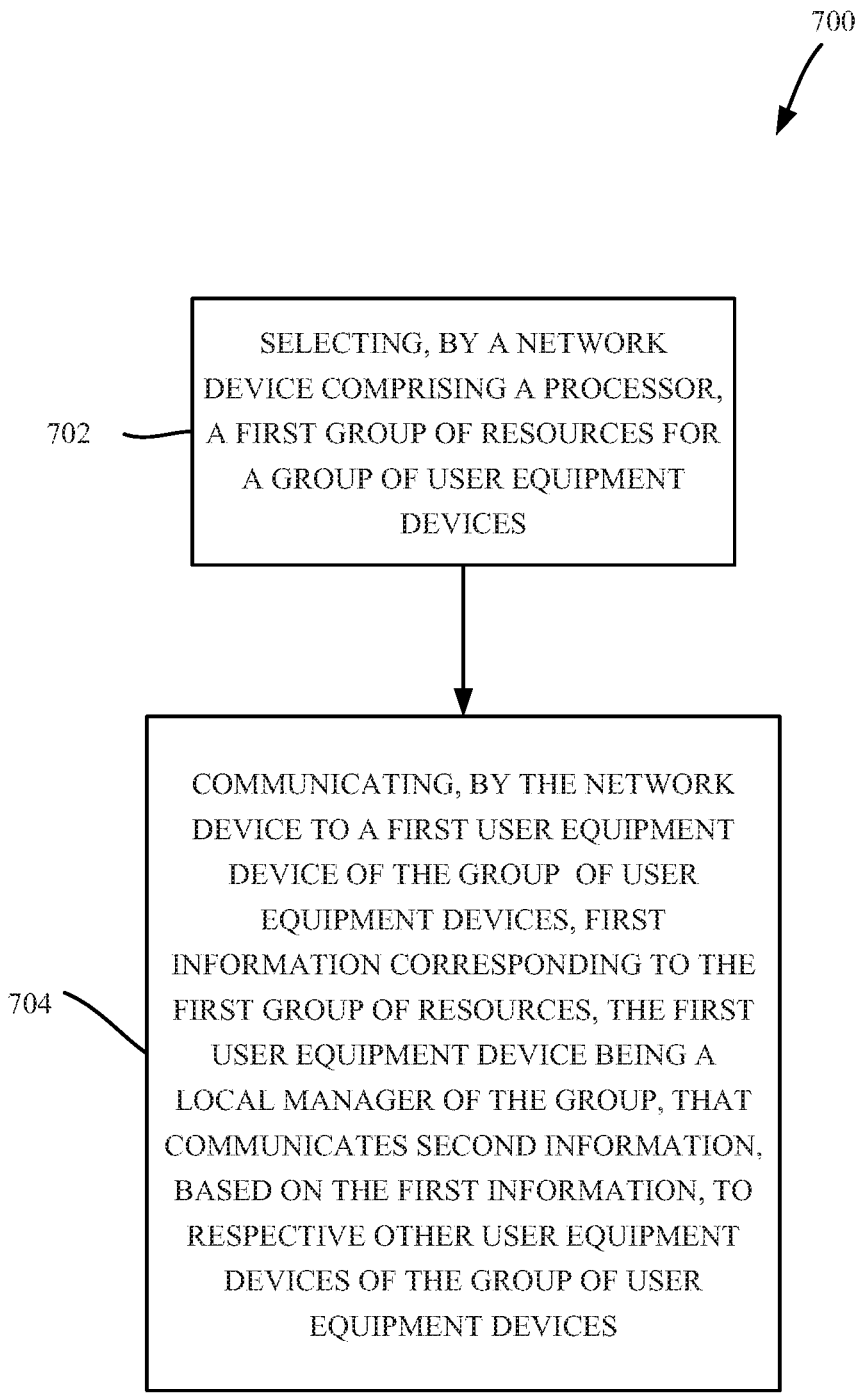
FIG. 7 illustrates a flow diagram of an example method that can facilitate communicating resource information to a local manager of a group of user equipment devices, for allocation of resources to the group, in accordance with one or more embodiments.

FIG. 7 illustrates a flow diagram of an example method 700 that can facilitate communicating resource information a local manager of a group of user equipment devices, in accordance with one or more embodiments. For purposes of brevity, description of like elements and/or processes employed in other embodiments is omitted.

At 702, example method 700 can select, by a network device (e.g., network device 150) comprising a processor (e.g., processor 160), a first group of resources (e.g., described by resource information 190) for a group of user equipment devices (e.g., group 185 of UEs 140A-C).

At 704, example method 700 can communicate, by the network device to a first user equipment device of the group of user equipment devices (e.g., UE 550A receives resource allocation from network device 510), first information corresponding to the first group of resources, the first user equipment device being a local manager of the group, that can communicate second information corresponding to a second group of resources, based on the first information (e.g., UE 550A can generate resource allocations based on the allocations received from network device 510), to respective other user equipment devices of the group of user equipment devices (e.g., UEs 550B-C).

Figure 8:
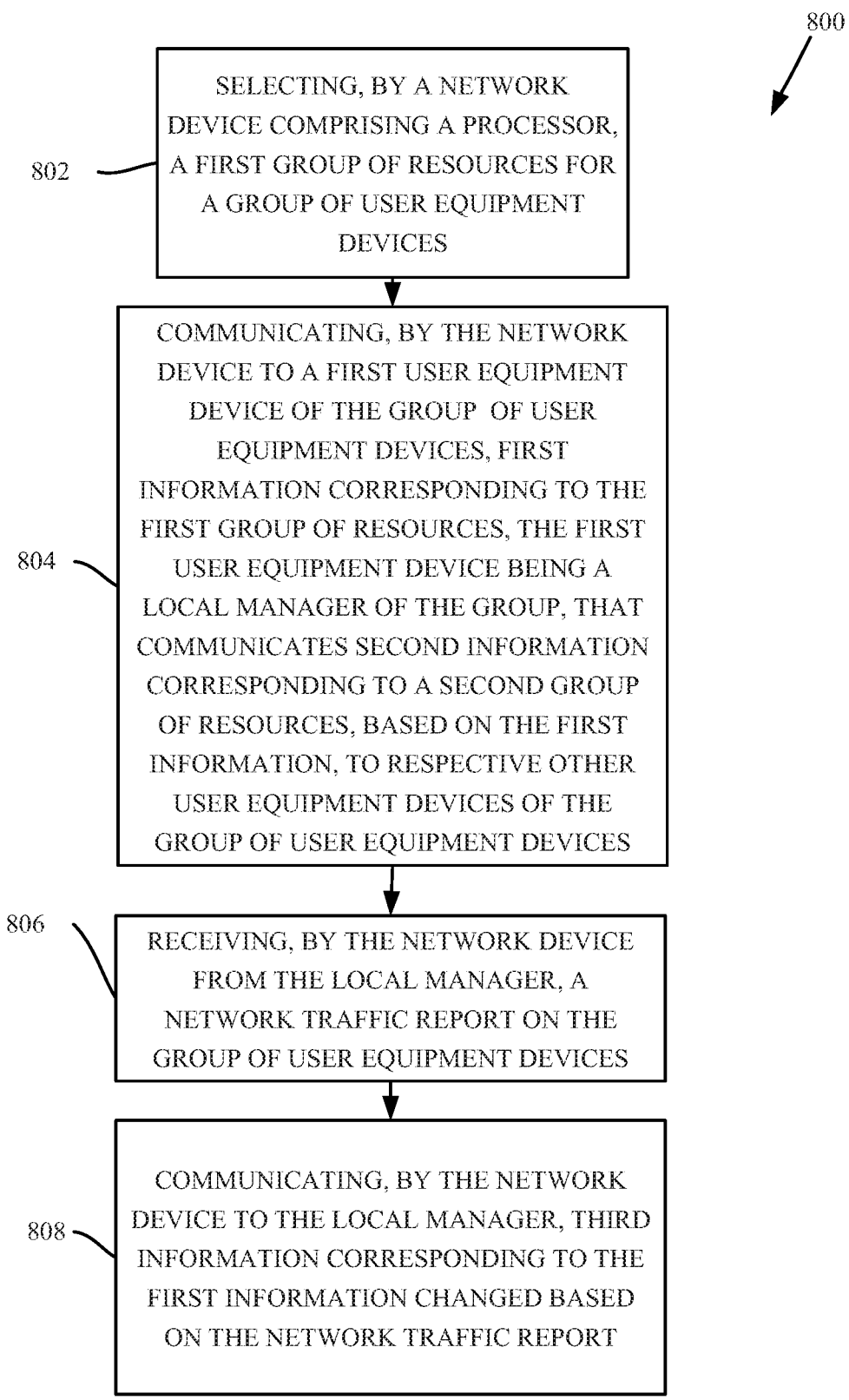
FIG. 8 illustrates a flow diagram of an example method that can facilitate communicating updated resource information to a local manager of a group based on a network traffic report from the group, in accordance with one or more embodiments.

FIG. 8 illustrates a flow diagram of an example method 800 that can facilitate communicating updated communication information to a local manager based on a network traffic report from the group, in accordance with one or more embodiments. For purposes of brevity, description of like elements and/or processes employed in other embodiments is omitted.

At 802, example method 800 can select, by a network device (e.g., network device 150) comprising a processor (e.g., processor 160), a first group of resources (e.g., described by resource information 190) for a group of user equipment devices (e.g., group 185 of UEs 140A-C).

At 804, example method 800 can communicate, by the network device to a first user equipment device of the group of user equipment devices (e.g., UE 550A receives resource allocation from network device 510), first information corresponding to the first group of resources, the first user equipment device being a local manager of the group, that can communicate second information corresponding to a second group of resources, based on the first information (e.g., UE 550A can generate resource allocations based on the allocations received from network device 510), to respective other user equipment devices of the group of user equipment devices (e.g., UEs 550B-C).

At 806, example method 800 can receive, by the network device (e.g., by network device 510) from the first local manager (e.g., by UE 550A), a network traffic report on the group of user equipment devices (e.g., an aggregate of the respective BSRs of UEs 550A-C).

At 808, example method 800 can communicate, by the network device to the first local manager, third information corresponding to a third group of resources comprising the first information changed based on the network traffic report (e.g., based on the aggregate BSR, network device 510 can select and communicate new resource information to UE 550A).

As can be seen, the technology described herein provides for increased robustness and reduced latency of initial access and V2X configuration when control plane and mobility signaling is provided over a sub6-GHz anchor link via multi-connectivity, (compared to a standalone architecture), in which V2X-capable UEs provide initial access, IDLE mode, control plane, and mobility functionality. The technology facilitates reduced overhead on mmWave backhaul links multiplexing cellular and V2X traffic (of one or more bands) by utilizing sub 6-GHz channels for control plane signaling instead of multiplexing both control and data links on mmWave bands. Still further, the technology described herein provides the ability to efficiently perform local manager configuration and association based on measurements/reports related to sidelink link quality metrics over sub6-GHz channels more efficiently than over the NR mmWave backhaul links. The technology described herein enables support for simultaneous cellular communication with a network infrastructure, in addition to V2X direct communication services on the same or different carriers.

Figure 9:
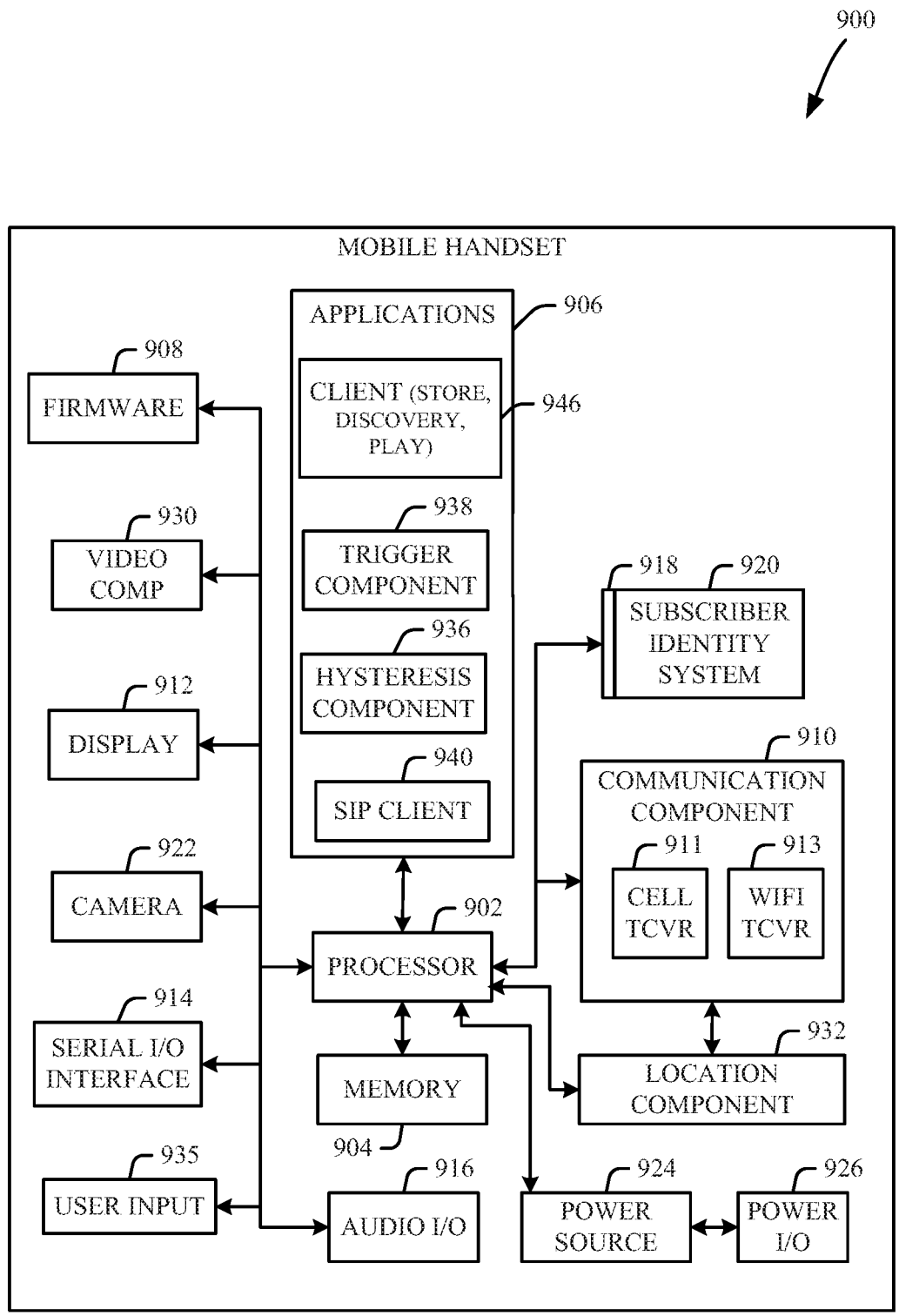
FIG. 9 illustrates an example block diagram of an example mobile handset operable to engage in a system architecture that can facilitate processes described herein, in accordance with one or more embodiments.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals.

The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Returning to aspects discussed with FIG. 2 above, in example implementations, user equipments, such as UEs 202A-C and handset 900, are able to send and/or receive communication data via a wireless link to the network device 204. Wireless communication system 200 can thus include one or more communication service provider networks that facilitate providing wireless communication services to various user equipments, including UEs 202A-C, via the network device 204 and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device 204 can be connected to the one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

The wireless communication system 200 can employ various cellular systems, technologies, and modulation schemes to facilitate wireless radio communications between devices (e.g., UEs 202A-C and the network device 204). While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 140A-C and the network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
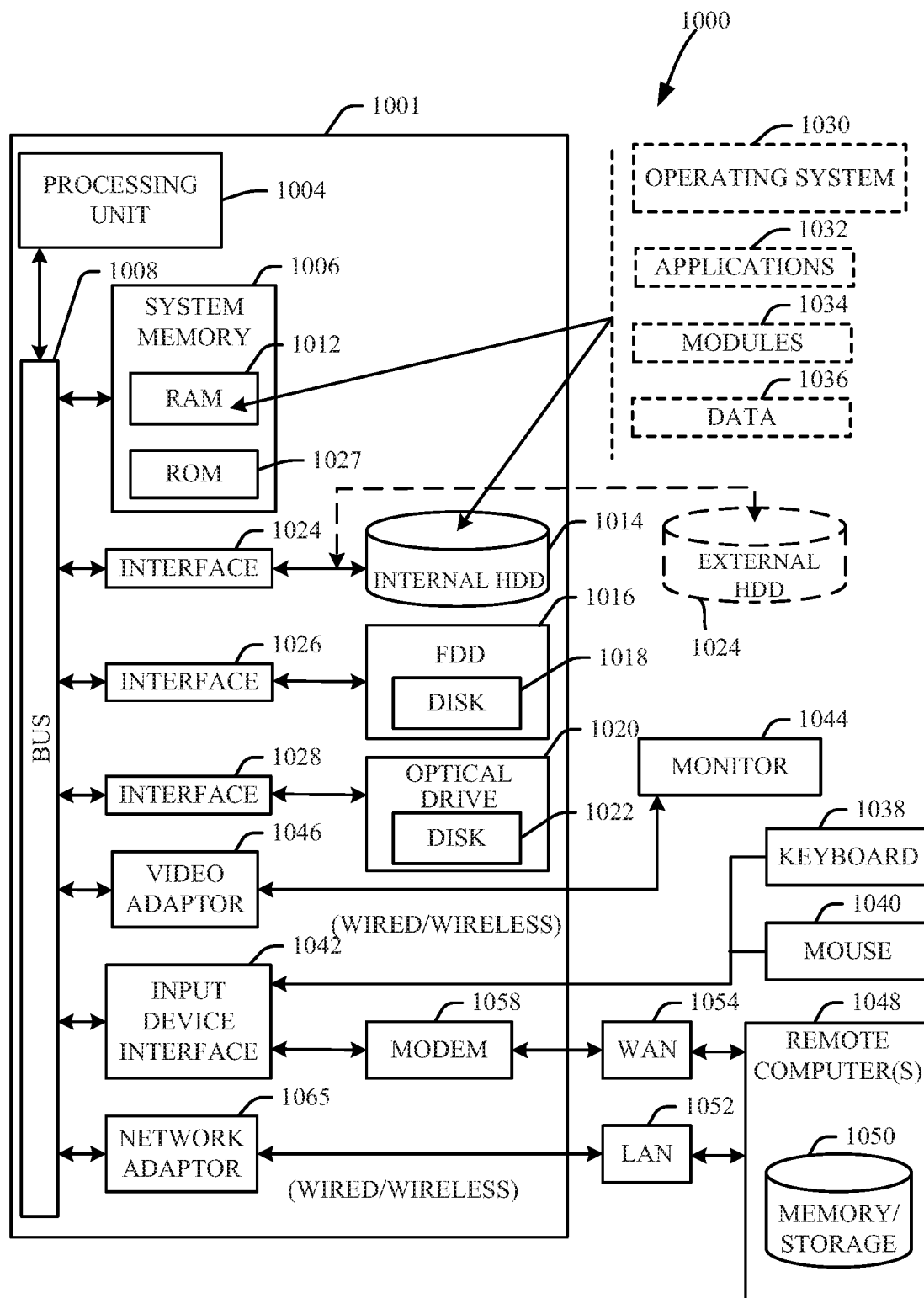
FIG. 10 illustrates an example block diagram of an example computer operable to engage in a system architecture that can facilitate processes described herein, in accordance with one or more embodiments.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of an operating environment 1000 operable to execute the disclosed systems and methods in accordance with an embodiment. Computer 1012, which can be, for example, part of the hardware of system 1020, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036. Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   selecting, by a network device comprising a processor, a first group of resources for a group of user equipment of groups of user equipment, wherein the first group of user equipment provides coverage to a geographic location where the network device is located, and wherein other groups of user equipment of the groups of user equipment provide other coverage to other geographic locations; and
   communicating, by the network device to a first user equipment of the group of user equipment, first information corresponding to the first group of resources, the first user equipment being a local manager of the group, that:
      based on the first information and traffic information received from a second user equipment of the group of user equipment, selects second information corresponding to a second group of resources, and
      communicates the second information to respective other user equipment of the group of user equipment other than the first user equipment.

2. The method of claim 1, wherein the second group of resources comprises resources individually assigned by the local manager to the respective other user equipment of the group of user equipment, and wherein the first group of resources is selected based on the user equipment of the group.

3. The method of claim 1, further comprising:
   receiving, by the network device from the local manager, a network traffic report on the group of user equipment; and
   communicating, by the network device to the local manager, third information corresponding to a third group of resources comprising the first information changed based on the network traffic report.

4. The method of claim 3, wherein the traffic information comprises a buffer status report of the second user equipment.

5. The method of claim 1, wherein the first group of resources and the second group of resources comprise time and frequency resources that facilitate sidelink communication, and wherein the user equipment of the group employ the second group of resources for the sidelink communication.

6. The method of claim 1, wherein communicating the first information comprises communicating a limiting condition with the first information, and wherein the user equipment of the group stop employing the first group of resources based on the limiting condition.

7. The method of claim 1, wherein communicating the first information to the first user equipment comprises communicating the first information and an indicator that the first group of resources is for use by the group.

8. The method of claim 7, wherein communicating the first information to the first user equipment employs an existing physical downlink control channel between the network device and the first user equipment.

9. The method of claim 1, wherein communicating to the first user equipment comprises communicating by employing a fifth generation radio access network protocol.

10. A system, comprising:
    a processor; and
    a memory that stores executable instructions that, when executed by the processor, facilitate performance of operations, comprising:
       selecting a first group of resources for a group of user equipment of groups of user equipment; and
       communicating, to a first user equipment of the group of the user equipment, first information corresponding to the first group of resources, wherein the group of user equipment enables coverage for a geographic location where the first user equipment is located, and wherein other groups of user equipment of the groups of user equipment enable other coverage for other geographic locations, and wherein the first user equipment comprises a first local manager of the group, that:
based on the first information and traffic information received from a second user equipment of the group of user equipment, selects second information corresponding to a second group of resources, and
communicates the second information to respective other user equipment of the group, other than the first user equipment.

11. The system of claim 10, wherein the second group of resources comprises resources individually assigned by the first local manager to the respective other user equipment of the group, and wherein the first group of resources is selected based on the user equipment of the group.

12. The system of claim 10, wherein the operations further comprise:
receiving, from the first local manager, a first network traffic report on the group of the user equipment; and
communicating, to the first local manager, third information corresponding to a third group of resources comprising the first group of resources changed based on the first network traffic report.

13. The system of claim 12, wherein the network traffic report comprises an aggregation of respective buffer status reports of the user equipment of the group, and wherein the first network traffic report is generated by the first local manager.

14. The system of claim 10, wherein the respective other user equipment of the group, other than the first user equipment, are respective first other user equipment of the group, wherein a second user equipment of the group of the user equipment is a candidate local manager of the group, and wherein the operations further comprise activating the candidate local manager, resulting in the candidate local manager becoming a second local manager of the group of the user equipment and the second local manager communicating fourth information corresponding to a fourth group of resources to respective second other user equipment of the group, other than the second user equipment.

15. The system of claim 14, wherein activating the candidate local manager comprises communicating, to the candidate local manager, an activation signal and the fourth information.

16. The system of claim 14, wherein the operations further comprise:
receiving, from the first local manager, a second network traffic report on the group of the user equipment;
communicating, to the first local manager, a fifth information corresponding to the first information changed based on the second network traffic report; and
receiving a third network traffic report on the group of the user equipment, and wherein the activating the candidate local manager comprises activating the candidate local manager based on the third network traffic report.

17. A non-transitory computer-readable storage medium, comprising executable instructions that, when executed by a processor of a network device, facilitate performance of operations, comprising:
selecting a first group of resources for a group of user equipment, resulting in a selected first group of resources; and
communicating, to a first user equipment of the group of the user equipment, first information corresponding to the selected first group of resources, wherein the group of user equipment facilitates network connectivity at a geographic location where the first user equipment is located, and wherein other groups of user equipment of the groups of user equipment provide facilitate network connectivity at respective other geographic locations, and wherein the first user equipment being a local manager of the group of the user equipment, that:
based on the first information and traffic information received from a second user equipment of the group of user equipment, selects second information corresponding to a second group of resources, and
communicates the second information to respective other user equipment of the group, other than the first user equipment.

18. The non-transitory computer-readable storage medium of claim 17, wherein the second group of resources comprises resources individually assigned by the local manager to the respective other user equipment of the group, and wherein the first group of resources is selected based on the user equipment of the group.

19. The non-transitory computer-readable storage medium of claim 17, wherein the operations further comprise:
receiving from the local manager, a network traffic report on the group of the user equipment; and
communicating to the local manager, third information corresponding to a third group of resources comprising the first information changed based on the network traffic report.

20. The non-transitory computer-readable storage medium of claim 19, wherein the network traffic report comprises an aggregation of respective buffer status reports of the user equipment of the group, and wherein the network traffic report is generated by the local manager.

* * * * *